United States Statutory Invention Registration [19]

[11] Reg. Number: H446

Kulsrud et al. [43] Published: Mar. 1, 1988

[54] METHOD OF CONTROLLING FUSION REACTION RATES

[75] Inventors: Russell M. Kulsrud; Harold P. Furth, both of Princeton; Ernest J. Valeo, Princeton Junction, all of N.J.; Maurice Goldhaber, Bayport, N.Y.

[73] Assignee: The United States of America as represented by the United States Department of Energy, Washington, D.C.

[21] Appl. No.: 854,667

[22] Filed: Apr. 18, 1986

Related U.S. Application Data

[63] Continuation of Ser. No. 492,924, May 9, 1983, abandoned.

[51] Int. Cl.[4] ..... G21B 1/00

[52] U.S. Cl. ..... 376/143; 376/107; 376/130; 376/146; 376/152; 376/915

[58] Field of Search ..... 376/107, 127–130, 376/915, 152, 143, 146; 324/300, 313, 319; 250/251

[56] References Cited

U.S. PATENT DOCUMENTS

| | | | |
|---|---|---|---|
| 3,723,246 | 3/1973 | Lubin | 376/101 |
| 3,755,073 | 8/1973 | Haught et al. | 376/101 |
| 3,859,164 | 1/1975 | Nowak | 376/107 |
| 4,172,008 | 10/1979 | Fleet | 376/107 |
| 4,246,067 | 1/1981 | Linlor | 376/107 |
| 4,390,494 | 6/1983 | Salisbury | 376/107 |

OTHER PUBLICATIONS

Physical Review Letters, vol. 49, (17), 1248, 10/25/82, Kulsrud et al.

IAEA-CN-41P, 9/1-8/82, pp. 1-11, Kulsrud et al.

American Physical Society, 46, (21) pp. 1387-1390, 1981, Bhaskar et al.

Soviet J. of Nuclear Physics, vol. 9, No. 2, 1969, pp. 167-171, Ad'Yasevich et al.

Nuclear Instruments & Methods, 124, (1975), pp. 1-10 Mano et al.

*Primary Examiner*—Harvey E. Behrend

*Attorney, Agent, or Firm*—Gustavo Siller; Paul A. Gottlieb; Judson R. Hightower

[57] ABSTRACT

A method of controlling the reaction rates of the fuel atoms in a fusion reactor comprises the step of polarizing the nuclei of the fuel atoms in a particular direction relative to the plasma confining magnetic field. Fusion reaction rates can be increased or decreased, and the direction of emission of the reaction products can be controlled, depending on the choice of polarization direction.

13 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF CONTROLLING FUSION REACTION RATES

CONTRACTUAL ORIGIN OF THE INVENTION

The U.S. Government has rights in this invention pursuant to Contract No. DE-AC02-76-CH03073 between the U.S. Department of Energy and Princeton University.

This is a continuation of application Ser. No. 492,924, filed May 9, 1983, now abandoned.

BACKGROUND OF THE INVENTION

This invention relates to a method of controlling the reaction rates in a nuclear fusion reactor; and more particularly, to the use of polarized nuclear fuel.

In order to make fusion easier to achieve, the interacting nuclei should have the smallest positive charge (i.e. lowest atomic number). Since hydrogen (H) and its isotopes deuterium (D) and tritium (T) all have the lowest atomic number and since hydrogen and deuterium are virtually unlimited in supply, the hydrogen isotopes are thought to be most suitable for a fusion reactor. The basic fusion reactions involving the hydrogen isotopes are:

$$D+D \rightarrow He^3+n \quad (1)$$

$$D+D \rightarrow T+H \quad (2)$$

$$D+T \rightarrow He^4+n \quad (3)$$

$$D+He^3 \rightarrow He^4+H \quad (4)$$

Studies of the probabilities or nuclear cross sections of these reactions indicate that reaction (3) has been found to take place most readily. It has also been found that reactions (1) and (2) take place at about the same rate. Reaction (2) is important because it means that tritium would not have to be supplied from an outside source (i.e. bred from the exotic fuel, lithium). Reactions (1) and (3) produce large numbers of high energy neutrons which are not available for use for ignition. Reaction (3) also produces large numbers of alpha particles which have to be contained. Control of the hydrogen isotope reaction rates would permit greater flexibility in the design and operation of a controlled fusion reactor.

Therefore, it is an object of the present invention to control the various reaction rates in a nuclear fusion reactor.

It is a further object of the present invention to enhance or suppress the various reaction rates in a nuclear fusion reactor.

Additional objects, advantages and novel features of the invention will be set forth in part in the description which follows, and in part will become apparent to those skilled in the art upon examination of the following or may be learned by practice of the invention.

SUMMARY OF THE INVENTION

Although it has been known that nuclear reaction rates are dependent on the polarization of the reactant nuclei, it was erroneously believed that various processes occuring in a fusion reactor would depolarize the reactant nuclei. The inventors have demonstrated (A detailed analysis appears in R. M. Kulsrud et al "Fusion Reactor Plasmas with Polarized Nuclei" presented at 9th International Conference on Controlled Nuclear Fusion Research, Sept. 1–8, 1982) that four processes that produce depolarization in a reactor: inhomogeneous fields, collisions, magnetic fluctuations which operate on the nuclei when they are in the reactor, and the atomic processes (recombination, chargeexchange and ionization), which operate during the injection phase or in a tokamak during the recycling phase produce depolarization rates that are so small that polarization in a reactor delay be maintainable at close to one hundred percent.

In accordance with the foregoing, a method of controlling the reaction rates of the fuel atoms in a controlled fusion reactor having a plasma confining magnetic field may comprise the step of polarizing the nuclei of the fuel atoms in a particular direction relative to the plasma confining magnetic field.

Improved nuclear fuel for use in a controlled fusion reactor having a plasma confining magnetic field may comprise fuel atoms whose nuclei are polarized in a particular direction relative to the plasma confining magnetic field.

The use of polarized fuel atoms produces a plasma of polarized nuclei. There are a number of practical advantages to be gained from the use of a polarized plasma in a fusion reactor. The nuclear reaction rates can be increased or decreased, and the direction of emission of the reaction products can be controlled.

DETAILED DESCRIPTION OF THE INVENTION

The effects of polarizing the various constituents of the four hydrogen isotope reactions will be discussed below.

$$D+T \rightarrow He^4+n \quad (3)$$

In the case of a magnetic D-T reactor the fractions of D nuclei polarized parallel, transverse, and antiparallel to the plasma confining magnetic field $\underset{\sim}{B}$ are denoted by $d_+$, $d_o$ and $d_-$, respectively, while the corresponding fractions of T nuclei are denoted by $t_+$ and $t_-$. Then the total nuclear cross-section for this reaction is:

$$\sigma = \left(a + \frac{2}{3}b + \frac{1}{3}c\right) f\sigma_o + \left(\frac{2}{3}b + \frac{4}{3}c\right)(1-f)\sigma_o$$

where $a=d_+t_++d_-t_-$, $b=d_o$, $c=d_+t_-+d_-t_+$, and f is the probability that the D-T reaction goes through the resonant 3/2+state of $He^5$, where $f \gtrsim 0.95$. For an unpolarized plasma, $a=b=c=\frac{1}{3}$ so that $\sigma=2/3\sigma_o$. If all the nuclei are polarized parallel to $\underset{\sim}{B}$ ($d_+=1$, $t_{30}=1$, $d_o=d_-=t_-=o$), then $a=1$, $b=c=o$ and $\sigma=f\,\sigma_o$, so that the enhancement of reactivity is 3/2f, nearly 50% faster.

The resultant angular distribution of the neutrons and alpha particles emitted in the D-T reaction are:

$$\frac{d\sigma}{d\Omega} = \frac{\sigma_o}{2\pi}\{f[\tfrac{3}{4}a\sin^2\theta + \tfrac{1}{4}(1+3\cos^2\theta)(\tfrac{2}{3}b+\tfrac{1}{3}c)] + (1-f)(\tfrac{2}{3}c+\tfrac{1}{3}b)\}$$

where $\theta$ is the pitch angle relative to $\underset{\sim}{B}$. If all the nuclei are polarized parallel to $\underset{\sim}{B}$, the angular distribution of the neutrons and alphas is $\sin^2\theta$. The advantage of this mode of polarization is that neutrons will pass through the surrounding reactor walls more nearly perpendicularly than in the unpolarized case, with correspondingly reduced first-wall damage and heating. This is especially useful in the particular case of a mirror machine: the neutron flux to the end plugs can be reduced and the fraction of alpha particles trapped in the mirror field can be enhanced.

In an alternate polarization mode $d_o=1$, the D nuclei are polarized nearly transverse to $\underset{\sim}{B}$, there is no enhancement to $\sigma$, but the alpha particles and neutrons are emitted preferentially along $\underset{\sim}{B}$. This mode of polarization may be particularly useful in a tokamak reactor, where fusion energy multiplication is less critical than in a mirror machine, so that enhancement of $\sigma$ is less important. Parallel emitted alpha particles are easier to contain in a tokamak reactor and make a more favorable contribution to MHD stability. Reduction of the neutron flux striking the small-major-radius side also simplifies tokamak blanket design.

$$D+D \rightarrow He^3+n \quad (1)$$

$$D+D \rightarrow T+H \quad (2)$$

The D-D reactions were analyzed using the data of Ad'Yasevich and Fomenko (Sov. Jour. Nucl. Physics 9, 167, 1969) based on their experiment involving a polarized beam of deuterons incident on an unpolarized target. In a D-D reactor the spin dependent cross sections have a complicated dependence on energy and enhancements of the reactions (1) and (2) are different. For ordinary thermal ion distribution, enhancements of order 2 (increase of 100%) can be obtained by polarizing the D nuclei transverse to $\underset{\sim}{B}$. If colliding-beam or beam-target methods are used, one beam should be polarized parallel to $\underset{\sim}{B}$ and the other beam should be polarized antiparallel to $\underset{\sim}{B}$, also giving enhancement of the order of 2. If, on the other hand, all the D nuclei are polarized parallel to $\underset{\sim}{B}$, the D-D reaction is suppressed by the order of 1/20, a decrease of 90%.

$$D+He^3 \rightarrow He^4+H \quad (4)$$

The D-$He^3$ reactor is nearly identical to the D-T reactor with different values of $\sigma_o$ and f. This reaction can also be enhanced by 1.5 (50% ) when the D nuclei are polarized parallel to $\underset{\sim}{B}$. This particular reaction is important because the D-D reaction would be suppressed while the D-$He^3$ reaction is enhanced, approximating a neutron-free fusion reactor, without resorting to exotic fuels such as p-Li.

EXAMPLE

There are several ways to make a polarized fusion reactor plasma. The starting point is polarized atomic hydrogen, deuterium, or tritium gas that has been made by the optical pumping method described by N.D. Bhaskar et.al., in Phys. Rev. Lett. 49, 25, 1982. In this method, the electron of a, say, deuterium atom is polarized by spin-exchange with an alkali-metal vapor, such as rubidium, that has been polarized by means of a dye laser. This is followed by polarization of the nucleus of the deuterium atom through interaction with its polarized electron in a moderate strength magnetic field.

There are several methods for introducing the now polarized gas into a fusion reactor. The reactor could be fueled directly. Starting with a volume of some tens of cubic centimeters of atmospheric pressure deuterium in a field of less than one kG, the gas can be puffed into the vacuum vessel of a fusion machine through a piping system that is maintained in a magnetic field of one kG or more. The gas is then ionized and heated in the usual way to form a plasma. An alternative method to introduce polarized plasma particles into the reactor is to inject a polarized neutral beam into the plasma, or the fuel could be injected as polarized ion beams along the plasma confining magnetic field. Also, injection of polarized hydrogen pellets may prove useful.

The embodiments of this invention in which an exclusive property or privilege is claimed are defined as follows:

1. A method of controlling the reaction rates of fuel nuclei in a fusion reactor having a plasma confining magnetic field, a vacuum vessel and a fuel consisting essentially of a fusion plasma, said method comprising the steps of:
   (a) polarizing the nuclei of neutral fuel atoms in a particular direction relative to the plasma confining magnetic field, said fuel atoms being polarized such that essentially all of said atoms have the same polarization;
   (b) injecting said polarized fuel atoms into said vacuum vessels; and
   (c) forming said fusion plasma from said polarized fuel atoms.

2. The method of claim 1 wherein said fuel atoms comprise D and T and wherein the nuclei of said D and T are polarized parallel to the plasma confining magnetic field such that said reaction rate is increased.

3. The method of claim 1 wherein said fuel atoms comprise D atoms and said D nuclei are polarized transverse to the plasma confining magnetic field, thereby increasing said reaction rate.

4. The method of claim 1 wherein said fuel atoms comprise D atoms and said D nuclei are polarized parallel to the plasma confining magnetic field, such that said reaction rate is suppressed.

5. The method of claim 1 wherein said fuel atoms comprise D and $He^3$ and said D nuclei are polarized parallel to said plasma confining magnetic field, such that said reaction rate is increased.

6. A method of controlling the direction of emission of the reaction products of the fuel in a fusion reactor having a plasma confining magnetic field, a vacuum vessel and a fuel consisting essentially of a fusion plasma said reaction products including neutrons and alpha particles, said method comprising the steps of:
   (a) polarizing the nuclei of said fuel atoms in a particular direction relative to the plasma confining magnetic field, said fuel atoms being polarized such that essentially all of said atoms have the same polarization;
   (b) injecting said polarized fuel atoms into said vacuum vessel; and
   (c) forming said fusion plasma from said polarized fuel atoms.

7. In a controlled fusion reactor having a vacuum vessel and a plasma confining magnetic field, an improved nuclear fuel which consist essentially of a plasma of fuel atoms with polarized nuclei.

8. The fuel of claim 7 wherein the fuel atoms comprise D and T atoms and said D and T nuclei are polarized parallel to the plasma confining magnetic field.

9. The fuel of claim 7 wherein the fuel atoms comprise D and $He^3$ atom and said D nuclei are polarized parallel to the plasma confining magnetic field.

10. The fuel of claim 7 wherein the fuel atoms comprise D atoms and said D nuclei are polarized parallel to the plasma confining magnetic field.

11. The fuel of claim 7 wherein the fuel atoms comprise D atoms and said D nuclei are polarized transverse to the plasma confining magnetic field.

12. The method of claim 6 wherein said fusion reactor is a mirror machine, said fuel atoms comprise D and T atoms and said D and T nuclei are polarized parallel to the plasma confining magnetic field, thereby increasing the fraction of alpha particles trapped in the mirror field.

13. The method of claim 6 wherein said fusion reactor is a tokamak, said fuel atoms comprise D and T atoms and said D nuclei are polarized transverse to the plasma confining magnetic field, thereby emitting said alpha particles and said neutrons along the plasma confining magnetic field.

* * * * *